United States Patent
Oleson et al.

(10) Patent No.: US 9,738,388 B2
(45) Date of Patent: Aug. 22, 2017

(54) AIRCRAFT SEAT WITH OCCUPANT WEIGHT SENSING MECHANISM TO ADJUST TILT-RECLINE FORCE

(71) Applicant: B/E Aerospace, Inc., Wellington, FL (US)

(72) Inventors: Michael L. Oleson, Parkland, FL (US); Arjun Koustubhan, Hyderabad (IN); Anatoly Starikov, Hollandale Beach, FL (US)

(73) Assignee: B/E Aerospace, Inc., Wellington, FL (US)

( * ) Notice: Subject to any disclaimer, the term of this patent is extended or adjusted under 35 U.S.C. 154(b) by 208 days.

(21) Appl. No.: 14/695,179

(22) Filed: Apr. 24, 2015

(65) Prior Publication Data

US 2015/0307194 A1    Oct. 29, 2015

Related U.S. Application Data

(60) Provisional application No. 61/983,781, filed on Apr. 24, 2014.

(51) Int. Cl.
| | |
|---|---|
| *B64D 11/06* | (2006.01) |
| *B60N 2/10* | (2006.01) |
| *B60N 2/12* | (2006.01) |
| *B60N 2/00* | (2006.01) |
| *B60N 2/44* | (2006.01) |

(52) U.S. Cl.
CPC ............ *B64D 11/064* (2014.12); *B60N 2/002* (2013.01); *B60N 2/442* (2013.01); *B60N 2002/4425* (2013.01)

(58) Field of Classification Search
CPC ........... B64D 11/064; B60N 2/10; B60N 2/12
See application file for complete search history.

(56) References Cited

U.S. PATENT DOCUMENTS

| 6,227,489 B1* | 5/2001 | Kitamoto ............... B64D 11/00 |
| | | 244/118.5 |
| 2001/0000639 A1* | 5/2001 | Park ..................... A47C 1/0352 |
| | | 297/411.3 |

(Continued)

FOREIGN PATENT DOCUMENTS

| GB | 2166948 A | 5/1986 |
| WO | 2005102112 A2 | 11/2005 |

OTHER PUBLICATIONS

International Search Report and Written Opinion of corresponding International Application No. PCT/US2015/020075; dated Oct. 13, 2015; 15 pages.

*Primary Examiner* — Timothy J Brindley
(74) *Attorney, Agent, or Firm* — Shumaker, Loop & Kendrick, LLP

(57) ABSTRACT

A weight sensing mechanism for an aircraft seat pan configured to adjust seat pan recline force and including a gas spring arranged between a fixed seat frame member and a movable seat pan member, the gas spring arranged to compress as the seat pan reclines in response to a load on the seat pan, and unloads upon removal of the load on the seat pan to assist in returning the seat pan to upright, and a helper spring positioned forward of and coaxially with the gas spring arranged to deflect under any load on the seat pan. A recline-capable seat pan assembly including a passenger body weight sensing mechanism.

20 Claims, 8 Drawing Sheets

(56) References Cited

U.S. PATENT DOCUMENTS

| | | | | |
|---|---|---|---|---|
| 2004/0066067 A1* | 4/2004 | Wagner | B60N 2/0228 | 297/216.15 |
| 2010/0187881 A1* | 7/2010 | Fujita | B60N 2/028 | 297/284.3 |
| 2012/0139302 A1* | 6/2012 | Estevenin | B64D 11/0015 | 297/162 |
| 2013/0082502 A1* | 4/2013 | Ward | B60N 2/433 | 297/378.11 |
| 2013/0113250 A1* | 5/2013 | Udriste | B64D 11/06 | 297/217.3 |
| 2014/0001802 A1* | 1/2014 | Piaulet | B60N 2/002 | 297/217.2 |
| 2014/0084655 A1* | 3/2014 | Thompson | B60N 2/067 | 297/344.1 |
| 2014/0300161 A1* | 10/2014 | Beroth | B64D 11/06 | 297/340 |
| 2015/0108804 A1* | 4/2015 | Meister | B64D 11/06 | 297/313 |
| 2015/0203205 A1* | 7/2015 | Thompson | B64D 11/064 | 297/344.1 |
| 2015/0284087 A1* | 10/2015 | Henshaw | B64D 11/064 | 297/318 |
| 2016/0229539 A1* | 8/2016 | Ferguson | B64D 11/0639 | |
| 2016/0311537 A1* | 10/2016 | Marini | B60N 2/4495 | |
| 2016/0325642 A1* | 11/2016 | Fitzpatrick | B60N 2/045 | |

* cited by examiner

AIRCRAFT SEAT WITH OCCUPANT WEIGHT SENSING MECHANISM TO ADJUST TILT-RECLINE FORCE

CROSS-REFERENCE TO RELATED APPLICATION

This application claims priority from U.S. Application No. 61/983,781 filed Apr. 24, 2014, the entirety of which is incorporated by reference herein.

TECHNICAL FIELD AND BACKGROUND OF THE INVENTION

The present invention relates generally to the field of aircraft seats, and more particularly, to an aircraft seat incorporating an occupant weight sensing mechanism configured to automatically adjust the tilt-recline force of the seat in proportion to the body weight of the seat occupant.

Aircraft seats are typically configured to recline from an upright takeoff sitting position to enhance passenger comfort during flight. Most aircraft seat recline mechanisms incorporate mechanical actuators for adjusting the position and angle of the seat pan and seatback relative to a fixed base frame. The seatback is typically pivotably connected to the seat pan such that movement of the seat pan drives movement of the seatback along a predetermined path, thereby maintaining a predetermined angular relationship between the seat pan and the seatback as the seat reclines.

There are currently no known aircraft seats that incorporate any form of weight sensing mechanism to adjust the tilt-recline force to help return the seat to the upright sitting position. Further, there are no known seat recline mechanisms that utilize the "free energy" from the weight of the seat occupant to help drive the system. Accordingly, embodiments of a weight sensing mechanism for an aircraft seat and an aircraft seat including a weight sensing mechanism are provided herein.

BRIEF SUMMARY OF THE INVENTION

It is an object of the invention to provide a seat pan configured to tilt/recline incorporating a passenger weight sensing mechanisms for assisting in returning the tilted/reclined seat pan to an upright sitting position.

It is another object of the invention to provide an aircraft seat passenger weight sensing mechanism configured to assist by providing a return force proportional to passenger body weight, thus utilizing "free energy" from passenger body weight to assist in driving the system.

It is a further object of the invention to provide a weight sensing mechanism wherein adjustment of the tilt/recline force may be automatic and directly proportional to the passenger body weight within an established range, for example, as dictated by spring size.

It is a further object of the invention to provide a weight sensing mechanism for a tilt/recline capable aircraft seat pan in which heavier seat occupants engage the system sooner than lighter seat occupants, thus realizing increased spring force in addition to primary gas spring force provided by at least one gas spring.

To achieve the foregoing and other objects and advantages, in one embodiment the present invention provides an aircraft seat pan assembly including left and right spreaders, a seat pan including left and right seat pan members each pivotably attached proximate a forward end to the left and right spreaders and free of attachment at a rearward end to the left and right spreaders such that the left and right seat pan members are configured to pivot to adjust seat pan angle, a first transverse beam interconnecting the left and right spreaders, a second transverse beam interconnecting the left and right seat pan members, a third transverse beam arranged to travel along guide slots of the left and right spreaders, a link interconnecting the second and third transverse beams, and a gas spring connected between the first and third transverse beams, wherein seat pan recline in response to passenger body weight drives the third transverse beam toward the first transverse beam to compress the gas spring, and removal of passenger body weight from the seat pan causes the gas spring to unload to drive the third transverse beam apart from the first transverse beam to assist in returning the seat pan from a reclined position to an upright position.

In another aspect, the left and right spreaders may be arranged to translate horizontally along fixed seat frame members.

In a further aspect, the assembly may include a plurality of spaced gas springs connected between the first and third transverse beams.

In a further aspect, the assembly may include a passenger body weight sensing mechanism configured to adjust seat pan recline force.

In a further aspect, the passenger body weight sensing mechanism may include the gas spring as a primary recline actuator, or in addition to the aforementioned gas spring, as well as a helper spring arranged to deflect under any passenger body weight.

In a further aspect, the helper spring may be mounted forward of and coaxially with the gas spring.

In a further aspect, the amount of helper spring deflection may increase as passenger body weight increases.

In a further aspect, helper spring force may be directly proportional to passenger weight within an established range as dictated by helper spring size.

In a further aspect, the passenger body weight sensing mechanism may further include a plate attached to an underside of seat pan springs, a lever attached to the plate, and a cable attached at one end to the lever and at an opposite end to a bracket that slides along a rail thereby pulling an attached chain along therewith, wherein lateral projections on certain ones of chain links of the chain extend through openings in a cylinder of the gas spring to limit compression of the helper spring.

In a further aspect, the body weight sensing mechanism may include a return spring arranged to return the chain to a neutral position upon removal of the passenger body weight from the seat pan.

In a further aspect, seat pan loading may depress the lever thereby pulling on the cable an amount proportional to passenger body weight, and the cable in turn pulling on the bracket, which in turn pulls on the chain.

In a further aspect, wherein as the chain moves the chain links may move relative to the gas spring and engage through a cylinder wall thereof, thereby limiting compression travel of the helper spring.

In another embodiment, the present invention provides a weight sensing mechanism for an aircraft seat pan configured to adjust seat pan recline force, including a gas spring arranged between a fixed seat frame member and a movable seat pan member, the gas spring arranged to compress as the seat pan reclines in response to a load on the seat pan, and unloads upon removal of the load on the seat pan to assist in returning the seat pan to upright, and a helper spring positioned forward of and coaxially with the gas spring arranged to deflect under any load on the seat pan.

In another aspect, an amount of helper spring deflection may increase as the load on the seat pan increases.

In a further aspect, helper spring force may be directly proportional to the load within an established range as dictated by helper spring size.

In a further aspect, the weight sensing mechanism may include a plate adapted to attach to an underside of seat pan springs, a lever attached to the plate, and a cable attached at one end to the lever and at an opposite end to a bracket that slides along a rail thereby pulling an attached chain along therewith, wherein lateral projections on certain ones of chain links of the chain extend through openings in a cylinder of the gas spring to limit compression of the helper spring.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, embodiments of aircraft passenger seat pan configurations and weight sensing mechanisms for assisting in returning a tilted/reclined seat pan to an upright sitting position are shown. The weight sensing mechanisms described herein generally assist by providing a return force proportional to the seat occupant's body weight, also referred to herein as the "passenger body weight" or "load" on the seat pan, thus utilizing "free energy" from the occupant's body weight to assist in driving the system. The adjustment of the tilt/recline force may be automatic and directly proportional to the occupant's body weight within an established range, for example, as dictated by the spring sizes selected.

As further described herein, the seat pan or "seat bottom" is configured to recline or tilt in response to passenger body weight (i.e., a load) and/or in connection with seatback recline. The terms "recline" and "tilt" as used herein with respect to the seat pan generally refer to seat pan movement in a direction from an upright sitting position or "upright position" in which the seat pan is nearest horizontal, to a more angled orientation relative to horizontal. In a preferred embodiment, seat pan tilt/recline in response to a load on the seat pan causes the rear of the seat pan to pivot downward.

Figure 1:
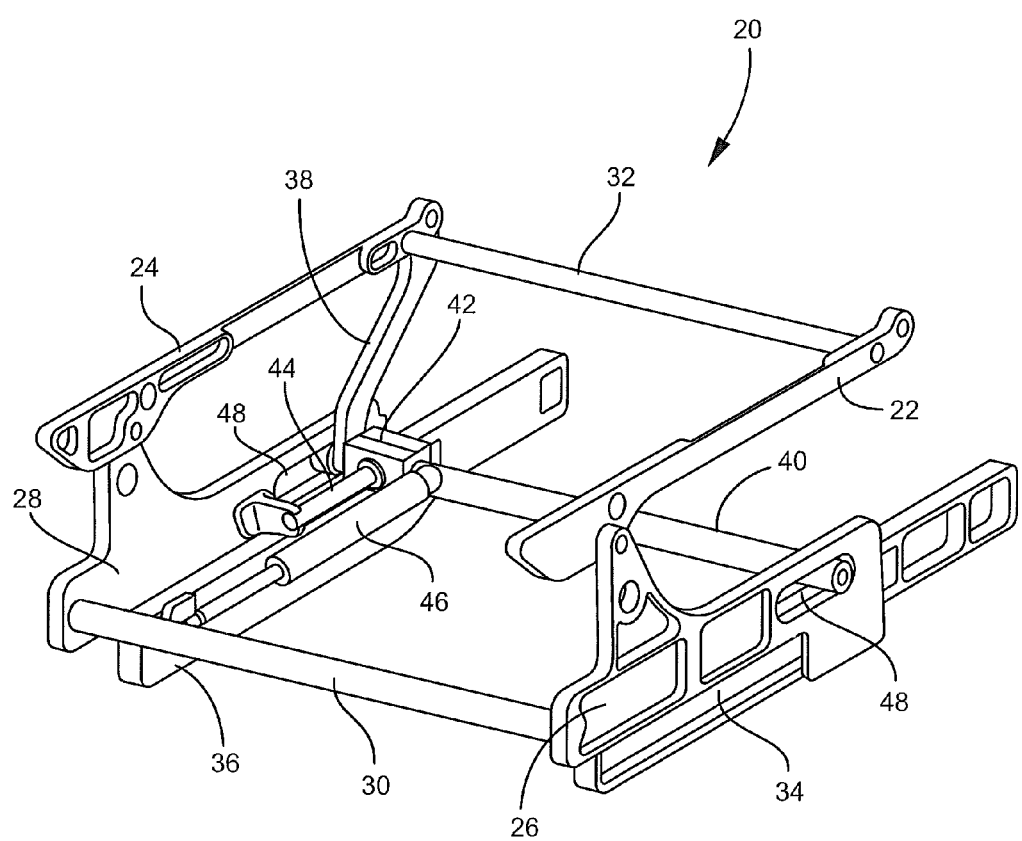
FIG. 1 is an isometric view of a seat pan assembly according to an embodiment of the invention.
Figure 2:
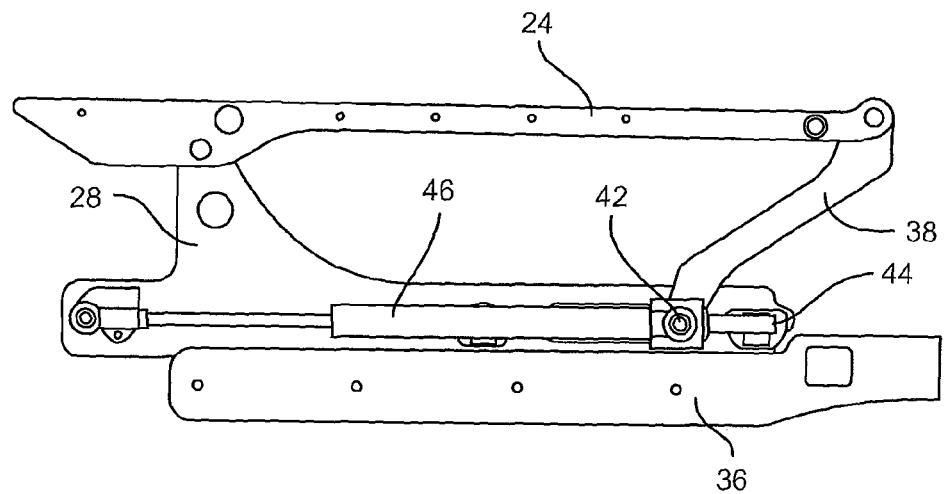
FIG. 2 is a side elevation view of the seat pan assembly of FIG. 1.

FIGS. 1 and 2 show a first embodiment of a seat pan assembly 20 configured to be incorporated into an aircraft passenger seat. The seat pan assembly 20 generally includes spaced left and right seat pan members 22, 24 pivotably attached proximate their forward end to spaced left and right spreaders 26, 28. The seat pan members 22, 24 are primary support structure of the seat pan, which may further include springs (see FIG. 10), webbing or the like spanning transverse or longitudinally between the left and right seat pan members and/or other transverse seat pan members in order to support a seat cushion.

One or more of the spaced seat pan members 22, 24 and spaced spreaders 26, 28 may be interconnected through transverse beam tubes to maintain the respective spaced components square and parallel during movement. As shown, the left and right spreaders are interconnected through a first fixed transverse beam 30 positioned proximate the forward ends of the spreaders. The rear ends of the left and right seat pan members are interconnected through a second transverse beam 32. In this arrangement, the left and right spreaders 26, 28 remain parallel as they translate horizontally relative to supportive left and right fixed seat frame members 34, 36, and the rearward end of the left and right seat pan members 22, 24 pivot together as the seat pan moves between upright and reclined.

A link 38 interconnects the second transverse beam 32 to a third transverse beam 40 such that pivoting movement of the second transverse beam drives movement of the third transverse beam. The link can 38 may be connected between the second and third transverse beams 32, 40. As shown, the link 38 is pivotably attached at one end proximate the rear end of the one of the left and right seat pan members 22, 24, and at the other end to a carriage 42 that slides along a horizontal rail 44 fixed to the inboard side of one of the spreaders 26, 28. Links, carriages, and horizontal rails may be provided on one or more of the inboard sides of the spreaders. Left and right carriage assemblies may be interconnected through the third transverse beam 40 to ensure that the left and right hand sides move together.

At least one gas spring 46 is connected between the first transverse beam 30 and the third transverse beam 40. As the rear end of the seat pan pivots downward (i.e., toward recline) in response to a load on the seat pan, the link 38 drives the carriage 42 forward, moving the third transverse beam 32 in the direction of the first transverse beam 30 thereby compressing and loading the gas spring 46. The third transverse beam 40 is guided along elongate slots 48 defined in the left and right spreaders 26, 28. As the seat pan reclines, the third transverse beam 40 is driven forward within the slots, and as the seat pan returns to upright the third transverse beam moves rearward in the slots. The range of pivoting movement of the seat pan can thus be controlled by customizing the length of the slots 48. Upon removal of the load from the seat pan, the gas spring 46 unloads by making use of the stored force in the gas spring to assist in returning the seat pan to upright.

Figure 3:
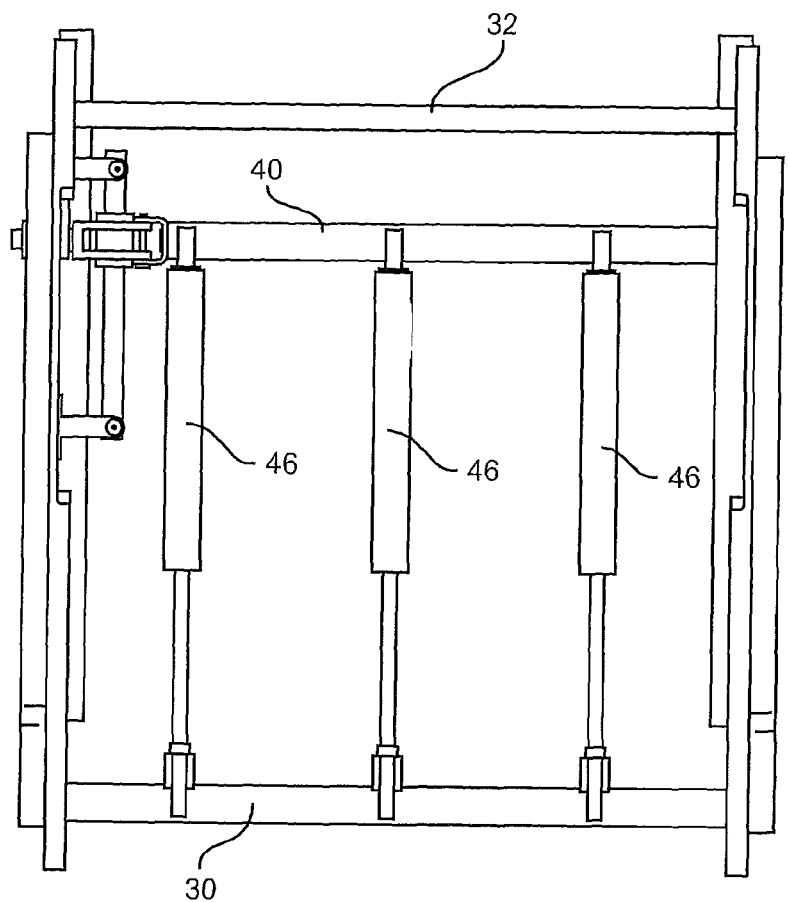
FIG. 3 is a top plan view of the seat pan assembly of FIG. 1 incorporating multiple gas springs.

FIG. 3 shows an alternative seat pan assembly embodiment including three equally spaced gas springs 36.

Figure 4:
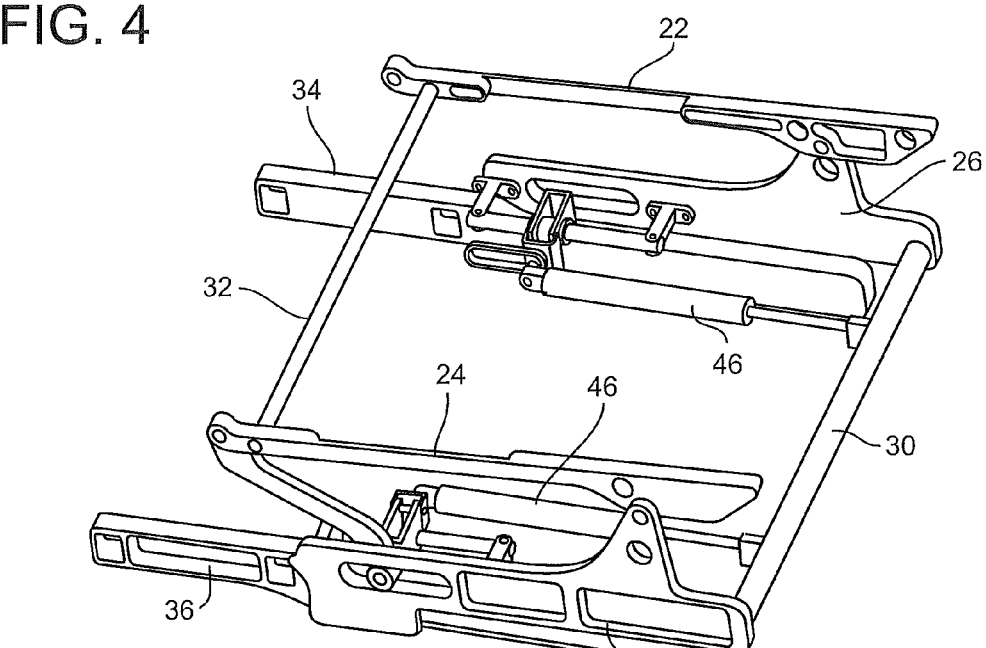
FIG. 4 is an isometric view of the seat pan assembly if FIG. 1 incorporating left and right side gas springs.

FIG. 4 shows an alternative seat pan assembly embodiment including left and right side gas springs 46 and the seat pan in the upright sitting position.

Figure 5:
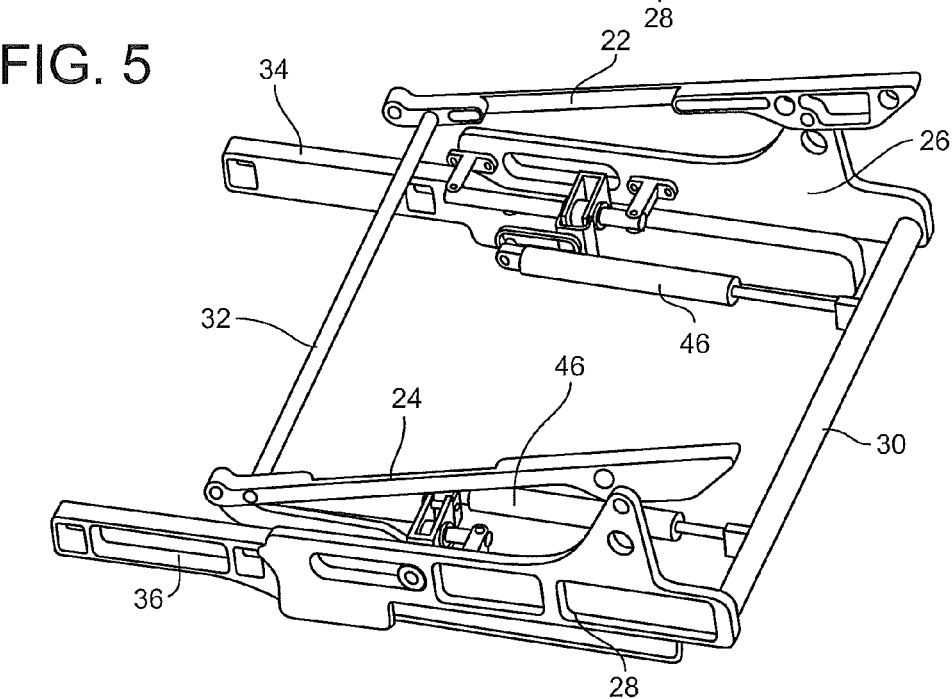
FIG. 5 shows the seat pan assembly of FIG. 4 in a tilted/reclined sitting position.

FIG. 5 shows the seat pan assembly of FIG. 4 with the seat pan in the reclined or tilted sitting position.

Figure 6:
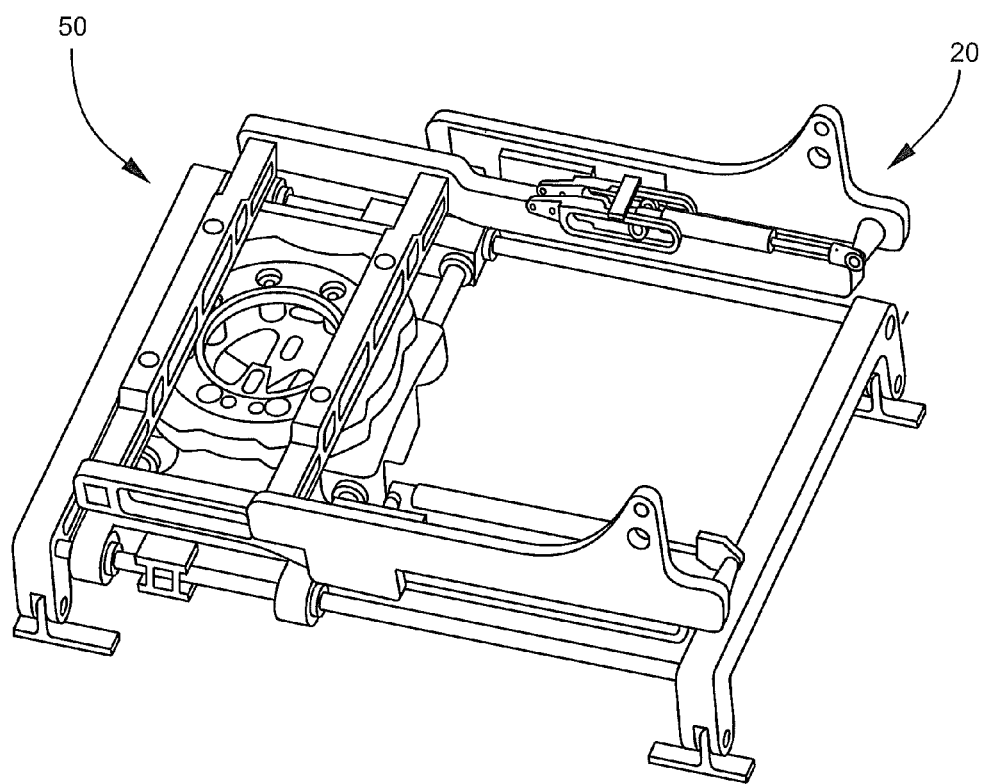
FIG. 6 shows the seat pan assembly mounted for horizontal translation on a seat base frame.
Figure 7:
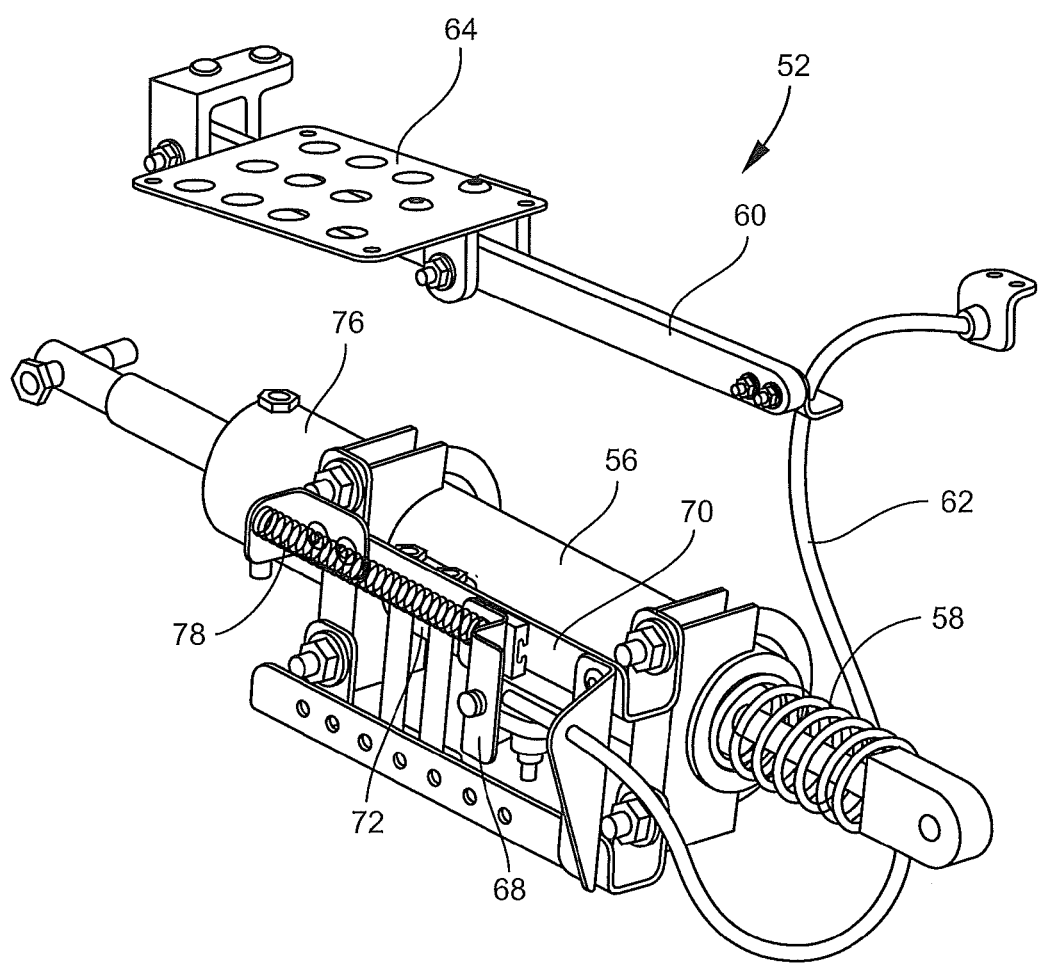
FIG. 7 is a perspective view of a weight sensing mechanism for an aircraft seat pan according to an embodiment of the invention.
Figure 8:
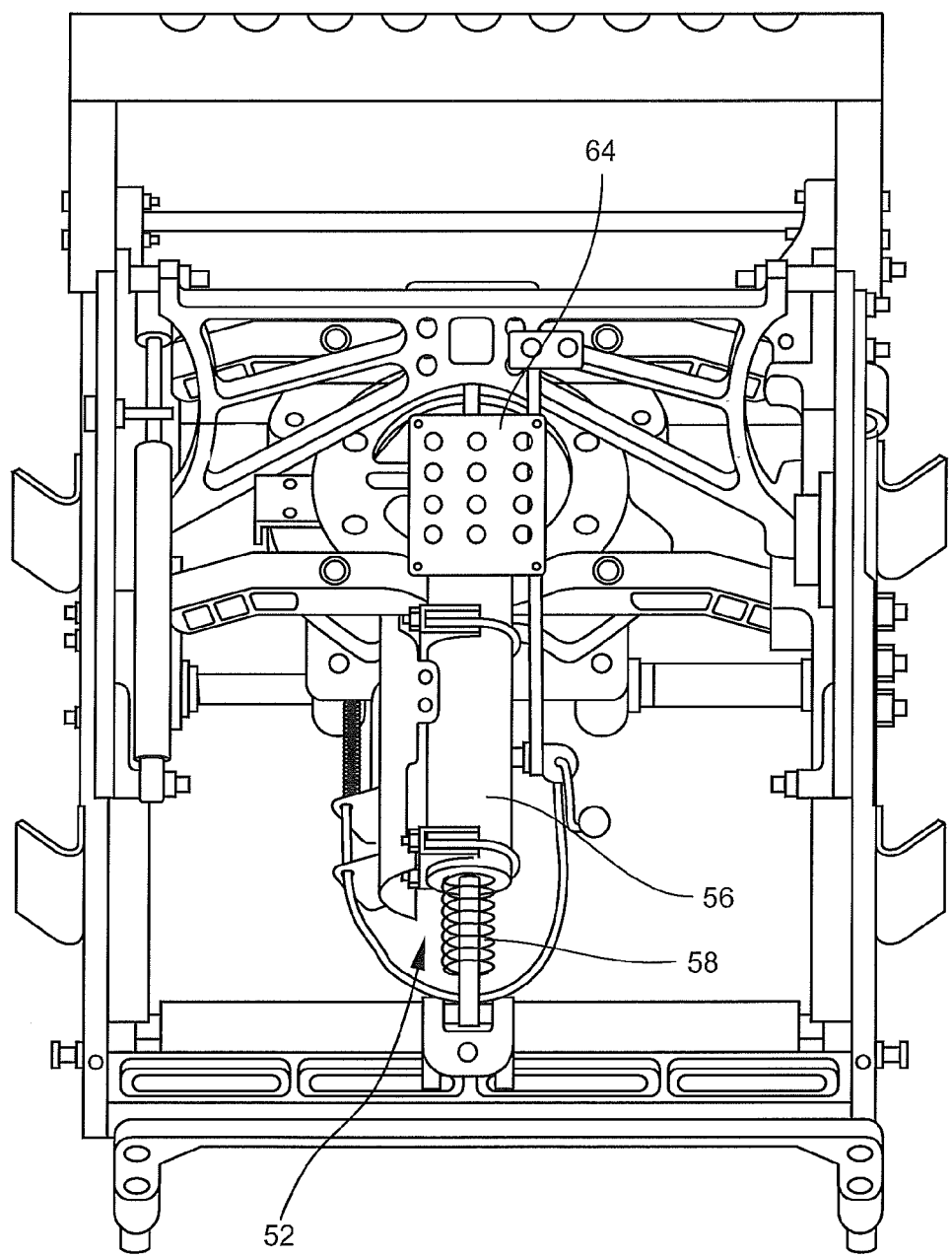
FIG. 8 is a top plan view showing the weight sensing mechanism of FIG. 7 installed on a seat base frame.
Figure 9:
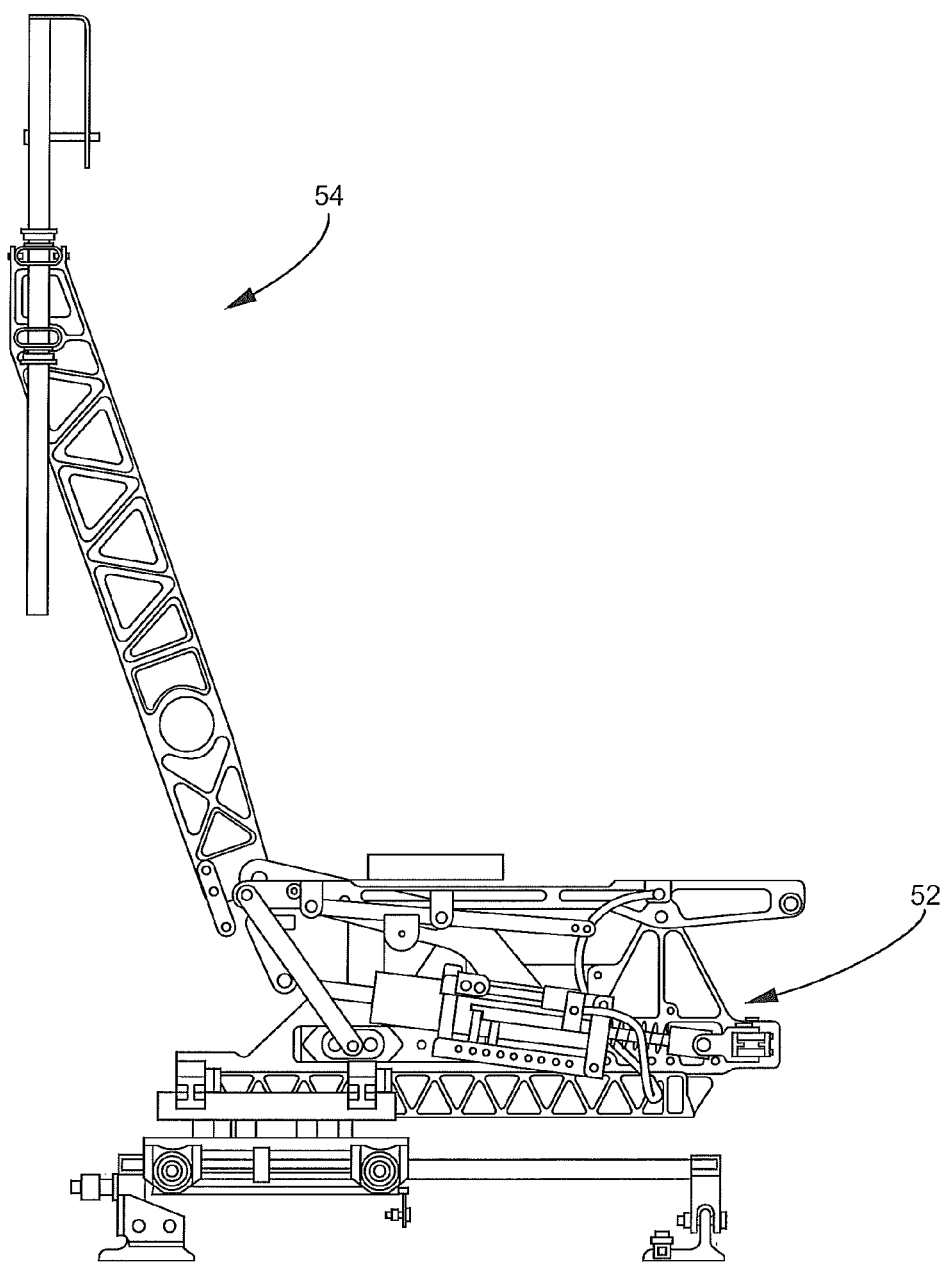
FIG. 9 is a side elevation view of an aircraft seat frame including the weight sensing mechanism of FIG. 7.

FIG. 6 shows the seat pan assembly mounted for horizontal translation on an underlying seat base frame 50. The seat pan assembly 20 is configured to translate horizontally in response to seat recline adjustment. The seat pan, which is typically pivotably connected to the lower end of a seatback (see FIG. 9), may translate forward to drive seatback recline, thereby maintaining an angular relationship between the seatback and seat bottom for enhanced comfort in a reclined sitting position.

FIGS. 7-11 show a weight sensing mechanism 52 incorporated into an aircraft passenger seat 54 for adjusting the tilt/recline force of the seat pan. The assembly utilizes a gas spring 56 as the primary tilt/recline actuator with the strength adequate to allow the seat to tilt/recline under low passenger body weight. The assembly further includes a helper spring 58 incorporated in the seat pan area arranged to deflect under all and any passenger body weight.

The amount of spring deflection increases with an increase in passenger body weight. The assembly utilizes the passenger body weight to adjust the helper-spring force by limiting the compression travel of the helper spring 58 as the passenger body weight increases. Hence, heavier seat occupants engage the helper spring 58 sooner than lighter ones, thus realizing increased spring force in addition to the primary gas spring force provided by the gas spring 56. This added force may be used to react to the increased body weight to allow the occupant to tilt/recline and return the seat pan to the upright sitting position for taxi, takeoff and landing. In this arrangement, the adjustment of the tilt/recline force is automatic and directly proportional to the seat occupant's body weight within an established range, as dictated by the spring sizes selected).

Figure 10:
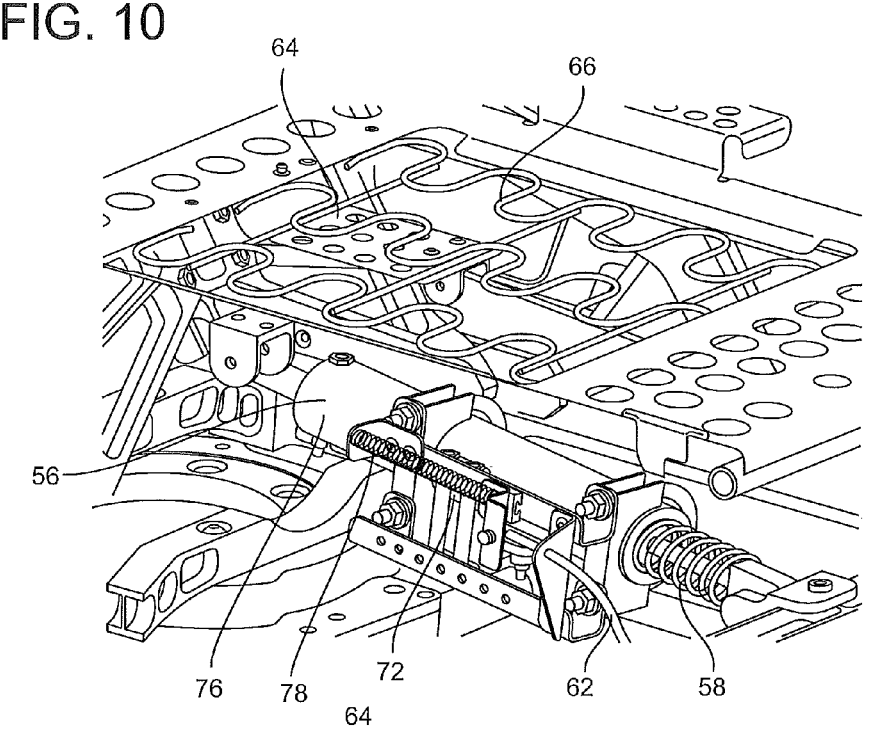
FIG. 10 is a detailed view of the weight sensing mechanism and seat base frame.
Figure 11:
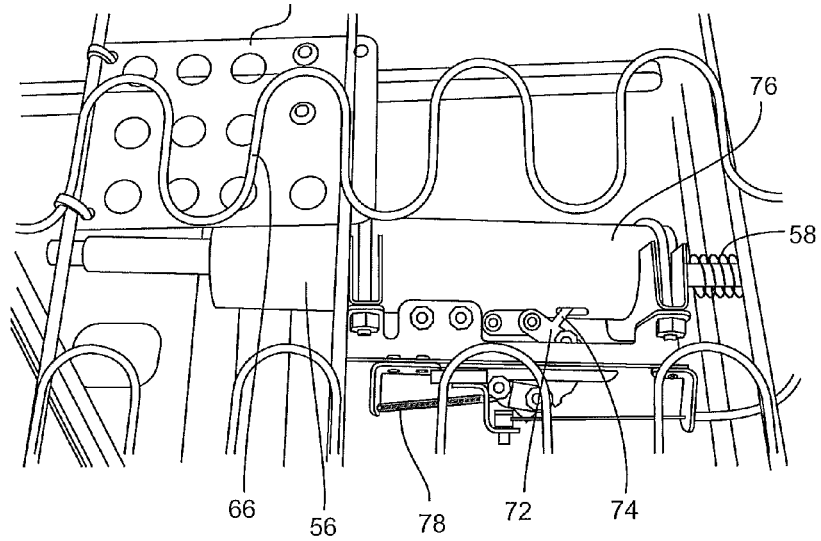
FIG. 11 is another detailed view of the weight sensing mechanism showing the engagement of the chain with the gas cylinder.

The weight sensing mechanism 52 generally includes the gas spring 56, a helper spring 58, a lever 60, a cable 62, and a plate 64. The helper spring 58 may be mounted forward of and coaxially with the gas spring 56. The plate 64 is adapted to attach to the underside of the seat pan, for example, to the underside of the seat pan springs 66 as shown in FIG. 10. The lever 60 is attached to the plate 64 such that the lever 56 is attached at one end to the seat pan and at the opposite end to the cable 62. The cable 62 is attached to a bracket 68 that slides along a rail 70, thereby pulling an attached chain 72 along therewith. As best shown in FIG. 11, stops 74 such as the lateral projections shown on certain ones of the chain links extend through openings in the gas spring cylinder 76 to limit the compression of the helper spring 58. A return spring 78 is arranged to return the chain 72 to the "neutral" position when the seat is unoccupied.

In use, when the seat occupant sits down, the lever 60 is depressed, thereby pulling on the cable 62 an amount proportional to the weight of the seat occupant. The cable 62 in turn pulls on the bracket 68, which in turn pulls on the chain 72. As the chain 72 moves, the chain links move with respect to the gas spring 56 and engage through the cylinder wall 76 thereof along the length thereof, thereby limiting the compression travel of the helper spring 58. Heavier seat occupants thus engage the helper spring 58 sooner, thus realizing increased spring force in addition to the primary gas spring force provided by primary gas spring 56.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat, comprising:
   a base member configured for coupling to floor of an aircraft cabin;
   a frame member pivotally attached to the base member, wherein the frame member is configured to pivotably adjust a tilt-recline positioning angle between a seat pan and the base member; and
   a tilt-recline force adjusting apparatus configured for tilt-recline positioning of the frame member including
      a first spring configured to urge the seat pan from a first operative position corresponding to a recline seating position of the aircraft passenger seat into a second operative position corresponding to an upright seating position of the aircraft passenger seat, the first spring being arranged to compress as the seat pan is reclined in response to application of a passenger body weight load,
   a helper spring arranged to assist or counteract the first spring,
   an adjustment mechanism coupled to the helper spring to increase or decrease a force exerted by the helper spring to assist or counteract the first spring, and
   a weight sensing mechanism coupled to the adjustment mechanism and operable to actuate the adjustment mechanism in direct proportion to a sensed weight of a seated passenger, whereby the force exerted by the helper spring is greater for a heavier seated passenger.

2. The aircraft passenger seat of claim 1, wherein the frame member is configured to:
   pivotably adjust the tilt-recline positioning angle between the seat pan and the base member in a downward direction in response to an increasing passenger weight; and
   pivotably adjust the tilt-recline positioning angle between the seat pan and the base member in an upward direction in response to a decreasing passenger weight.

3. The aircraft passenger seat of claim 1, wherein the frame member comprises a forward transverse member and an aft transverse member disposed between left and right structural members of the base member.

4. The aircraft passenger seat of claim 3, wherein downward adjustment of the tilt-recline positioning angle between the seat pan and the base member drives horizontal translation of a first of the forward and aft transverse members toward a second of the forward and aft transverse members, causing compression of the first spring.

5. The aircraft passenger seat of claim 3, wherein upward adjustment of the tilt-recline positioning angle between the frame member and the base member causes an unloading of the first spring that drives horizontal translation of a first of the forward and aft transverse members away from a second of the forward and aft transverse members.

6. The aircraft passenger seat of claim 1, wherein weight sensing mechanism comprises a plate coupled to a pivoting member.

7. The aircraft passenger seat of claim 6, wherein the plate is affixed to a surface of the seat pan.

8. The aircraft passenger seat of claim 6, wherein the weight sensing mechanism comprises a cable attached at one end to the pivoting member and at an opposite end to the adjustment mechanism to trigger adjustment of the force exerted by the helper spring.

9. The aircraft passenger seat of claim 8, wherein the sensed weight of the seated passenger causes downward rotation of the pivoting member, the downward rotation of the pivoting member pulling the cable by the amount proportional to the sensed weight of the seated passenger.

10. The aircraft passenger seat of claim 1, wherein:
the first spring is a gas spring comprising an outer cylinder including at least one aperture; and
the adjustment mechanism comprises a chain having at least one lateral projection;
wherein, upon actuation by the weight sensing mechanism, the adjustment mechanism moves the chain to align the lateral projection with a first aperture of the at least one aperture such that the lateral projection extends through the opening to limit compression of the helper spring.

11. The aircraft passenger seat of claim 10, wherein the weight sensing mechanism comprises:
a rail; and
a bracket configured to slide along the rail, wherein the chain is attached to the bracket.

12. The aircraft passenger seat of claim 11, wherein the weight sensing mechanism comprises a return spring configured to return the chain to a neutral position in response to a reduction in the sensed weight of the seated passenger.

13. The aircraft passenger seat of claim 1, wherein the helper spring is mounted forward of and coaxially with the first spring.

14. The aircraft passenger seat of claim 1, wherein an amount of adjustment of the tilt-recline positioning angle between the seat pan and the base member in the downward direction is directly proportional to the sensed weight of the seated passenger.

15. The aircraft passenger seat of claim 14, wherein the amount of adjustment of the tilt-recline positioning angle the seat pan and the base member in the downward direction causes a proportional amount of compression of the first spring of the tilt-recline force adjusting apparatus.

16. The aircraft passenger seat of claim 1, wherein an amount of helper spring deflection is directly proportional to the sensed weight of the seated passenger.

17. The aircraft passenger seat of claim 16, wherein a sensed weight of a heavier seated passenger causes earlier engagement of the helper spring than a sensed weight of a lighter seated passenger.

18. An aircraft passenger seat comprising:
a seat pan;
a base member configured for coupling to floor of an aircraft cabin;
a frame member pivotally attached to the base member, wherein the frame member is configured to pivotably adjust a tilt-recline positioning angle between the seat pan and the base member;
means for sensing a weight of a seated passenger;
a first spring configured to urge the seat pan from a first operative position corresponding to a recline seating position of the aircraft passenger seat into a second operative position corresponding to an upright seating position of the aircraft passenger seat, the first spring being arranged to compress as the seat pan is reclined in response to application of a passenger body weight load;
a helper spring arranged to assist or counteract the first spring; and
means for adjusting a force exerted by the helper spring in response to the weight sensed by the means for sensing, whereby the force exerted by the helper spring is greater for a heavier seated passenger.

19. The aircraft passenger seat of claim 18, wherein the means for sensing comprises a plate coupled to a pivoting member.

20. The aircraft passenger seat of claim 18, wherein:
the first spring is a gas spring comprising an outer cylinder including at least one aperture; and
the means for adjusting is configured to cause alignment between a lateral projection and a first aperture of the at least one aperture in the outer cylinder of the gas spring such that the lateral projection extends through the opening to limit compression of the helper spring.

* * * * *